Feb. 4, 1936.　　　　R. LUCAS　　　2,029,729
PIEZOELECTRIC QUARTZ CRYSTAL
Filed Dec. 4, 1933
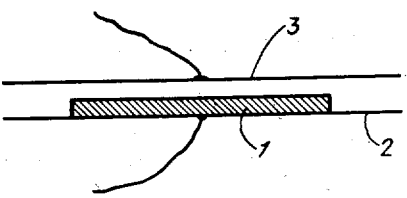
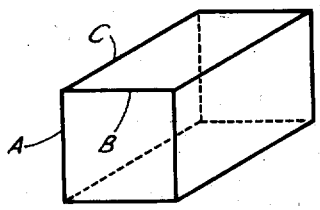
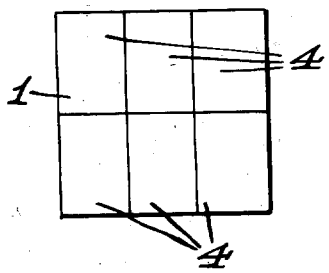
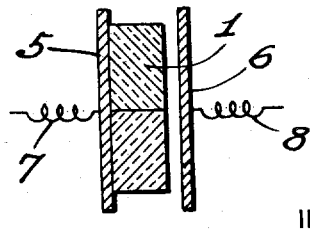
INVENTOR
RENE LUCAS
BY
ATTORNEY Patented Feb. 4, 1936

2,029,729

UNITED STATES PATENT OFFICE 2,029,729

PIEZOELECTRIC QUARTZ CRYSTAL

René Lucas, Paris, France, assignor to Compagnie Generale de Telegraphie Sans Fil, Paris, France, a corporation of France Application December 4, 1933, Serial No. 700,854
In France December 3, 1932

2 Claims. (Cl. 171—327)

The use of piezo-electric plates (quartz or tourmaline) whether for the purpose of stabilizing the frequencies of an electric oscillator, or to constitute frequency filters is so well known that it is not necessary to enumerate the advantages obtainable by these piezo-electric plates.

Occasional difficulties are, however, encountered in the use of piezo-electric plates which may be very annoying, particularly when the plates are used as frequency filters. It can generally be observed that a given plate possesses an extremely wide frequency range so that instead of having a filter for one determined frequency $f$, the same may also be effective for a series of undesirable values.

The object of the present invention is to define certain conditions of the cut of the crystal which may best be adhered to in order to reduce the number of natural frequencies of a piezo-electric plate to a minimum amount.

My present invention is more fully described with the aid of the accompanying drawing, wherein Fig. 1 illustrates a quartz plate or piezo-electric crystal mounted between a pair of electrodes;

Fig. 2 is an enlarged view of a quartz plate cut in accordance with my present invention;

Fig. 3 indicates diagrammatically a mosaic of crystal plates, each of which is cut in accordance with this invention;

Fig. 4 is a vertical cross-section of Fig. 3.

In the ordinary apparatus a quartz plate I (Figure 1) is used, for instance, whose electric axis is perpendicular to two planes 2 and 3 and whose thickness is of proper value. As soon as an alternating potential difference is applied between 2 and 3 the plate I becomes the seat of expansions and contractions in the direction of the electric axis. Considerable danger exists (as found by experience) that this simple movement may become complicated by oscillations due to elastic waves which are propagated in directions parallel to the crystal electrodes. In these directions the quartz generally presents dimensions which are of considerable extent in comparison with the thickness of the plate so that together with the frequency $F$ of oscillations in the direction of the electric axis, a series of corresponding harmonics of the fundamental frequency $f$ of the elastic waves may be produced which propagate perpendicular to the electric axis at a value $f<F$. These oscillations cause a periodical modification of the thickness of the quartz and consequently cause a change of the value $F$. It is thus easily conceivable why the quartz has a multiplicity of natural frequencies. It will be readily undertood that the above mentioned arrangement operates in a different manner if care is taken so as to limit the dimensions of the quartz perpendicular to the electric axis in such manner that the only possible natural frequency be equal in these directions to that which follows the electric axis. These conditions can be obtained when elements are used having the shape of parallelopipeds in accordance with Figure 2.

The elementary quartz parallelopipeds have the same dimension in one of the electrical or X-axis and in the crystallographic, or Y-axis perpendicular to that electrical axis and to the ternary, or Z-axis of the quartz. In fact in the directions of the X-axis and the Y-axis the speed of propagation of the longitudinal waves has substantially the same value. It is however preferable to make the dimension in the ternary, or Z-axis slightly different since in this direction the longitudinal elastic waves have a speed different from that following the electric axis. It will be understood that by suitable adaptation of these dimensions an element can be obtained not presenting more than a single fundamental frequency $F$ for the longitudinal vibrations in the electrical axis as well as for the longitudinal vibrations perpendicular to this axis in the two directions of the ternary axis of one part and of the normal direction to the ternary axis and to the electric axis of the other part.

It is obviously proper to use a sort of mosaic of quartz prisms cut in the aforementioned manner and placed side by side in such manner so as to produce a substitute shape for the plate in Figure 1 presenting only one fundamental frequency $F$. In line with this idea Fig. 3 represents a plan view of the lamella, a lamina or plate I, as indicated by Fig. 1. This lamella is a mosaic I comprising six crystals 4, each being dimensioned as heretofore indicated. Fig. 4 is a vertical cross-section of mosaic I which is positioned between electrodes 5 and 6. Suitable connections are made from the electrodes by means of terminal leads 7 and 8.

The propagation speeds of longitudinal waves along the optical, or Z-axis and along the perpendicular senses X and Y are slightly variable as a function of the quality of crystal used, but it has been determined by experience that their relation is about 1.14 to 1.

A crystal having for example the following dimensions:

A=1 mm. along an electrical axis;
B=1 mm. along a Y-axis perpendicular to A;
C=10 mm. along the ternary, optical, or Z-axis has been found to oscillate, as far as its fundamental wave is concerned, with a frequency of about 3000 kilocycles, but was not free from parasitic oscillations. The parasitic frequencies arising from the oscillations along the Z-axis comprised a fundamental wave of the frequency of $$\frac{3000}{10} \times 1.14$$

kilocycles as well as its odd harmonics.

According to this invention, the said parasitic frequencies, are eliminated when the quartz is so dimensioned along the Y- and Z-axes that it satisfies to the relation:

$$A = B = \frac{C}{1.14}$$

Having thus described my invention, what I claim is:

1. A piezo-electric crystal having three axes, one electrical, another axis ternary, and a third axis at right angles to the two preceding axes, the dimensions of the crystal being the same along the electrical axis and along the said third axis, whereas the dimension in the ternary axis is slightly different, the ratio between this dimension and the preceding ones being equal to the relationship of the speeds of propagation of elastic waves in different axes of the crystal, the latter thus presenting the same fundamental frequency of vibration in the three axes.

2. A piezo-electric device comprising a mosaic consisting of a plurality of piezo-electric crystals ranged side by side each crystal having three axes, one electrical, another axis ternary, and a third axis at right angles to the two preceding axes, the dimensions of the crystal being the same along the electrical axis and along the said third axis, whereas the dimension in the ternary axis is slightly different, the ratio between this dimension and the preceding ones being equal to the relationship of the speeds of propagation of elastic waves in different axes of the crystal, the latter thus presenting the same fundamental frequency of vibration in the three axes and electrodes extending along the surface of said mosaic.

RENÉ LUCAS.